E. DUCHESNE.
PISTON TOGGLE MECHANISM.
APPLICATION FILED OCT. 8, 1920.

1,365,667.

Patented Jan. 18, 1921.

INVENTOR
E. Duchesne
BY E. J. Fetherstonhaugh
ATTORNEY

UNITED STATES PATENT OFFICE.

ERNEST DUCHESNE, OF SCHENECTADY, NEW YORK.

PISTON TOGGLE MECHANISM.

1,365,667.  Specification of Letters Patent.  Patented Jan. 18, 1921.

Application filed October 8, 1920. Serial No. 415,667.

*To all whom it may concern:*

Be it known that I, ERNEST DUCHESNE, residing at 9 Waverly Place, in the city of Schenectady, in the State of New York, in the United States of America, have invented a new and useful Piston Toggle Mechanism, of which the following is the specification.

The invention relates to piston toggle mechanism as described in the present specification and illustrated in the accompanying drawings that form part of the same.

The invention consists essentially in the novel means employed for locking the piston rods of a set to the crank pin.

The objects of the invention are to eliminate the waste due to the breaking of toggles in pneumatic tools, thereby reducing the cost of production in locomotives, ships, and various other manufactures; to simplify the assembly of the parts in such machines; to add to the mechanism patented under Number 407,823, dated September 2, 1920; and generally to provide a reliable, durable and efficient piston connecting rod mechanism where cylinders are set at an angle.

In the drawings, Figure 1 is a sectional perspective view, showing the toggle joint.

Like numerals of reference indicate corresponding parts in each figure.

Figures 1, 2, 3, 4:
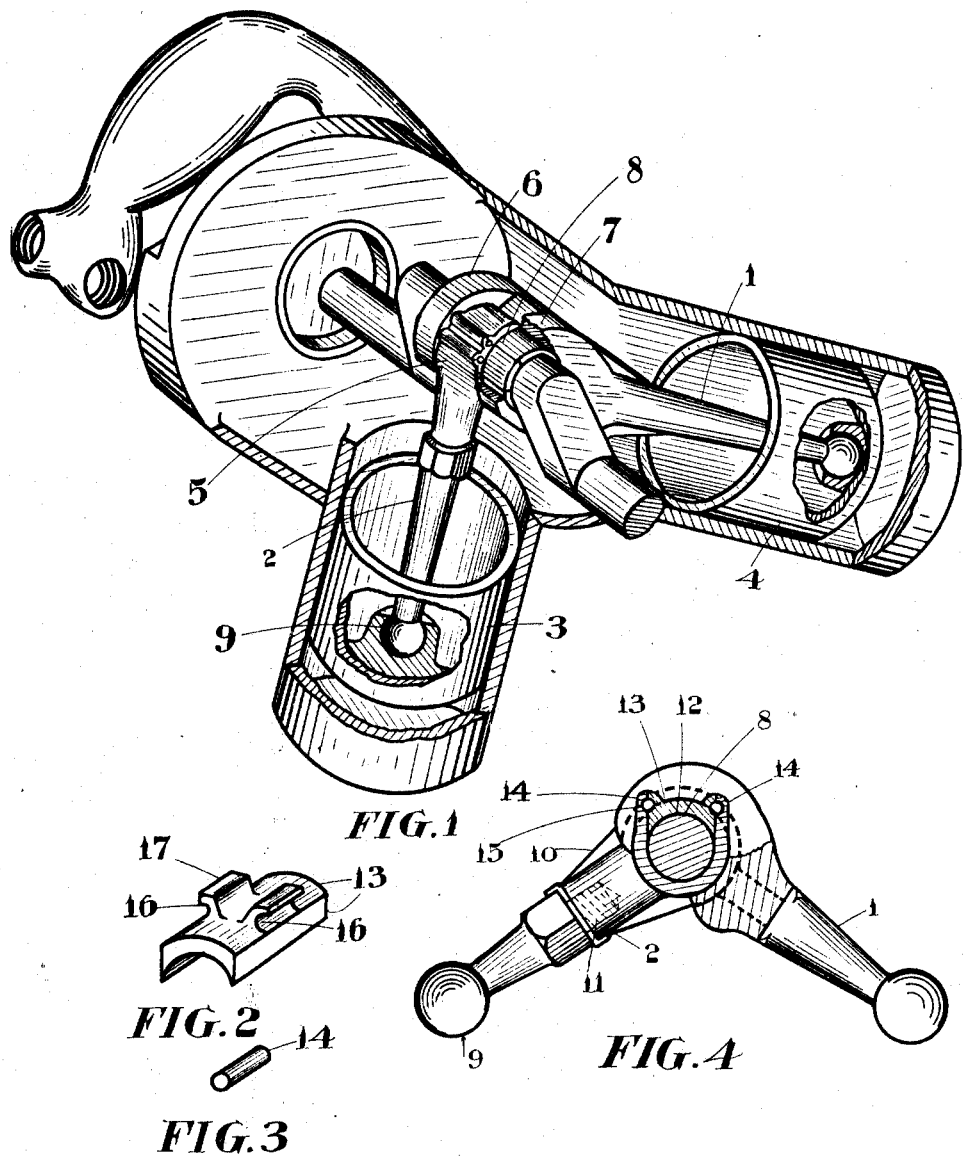
Fig. 2 is a perspective detail of the closure block.
Fig. 3 is a perspective detail of the locking pin.
Fig. 4 is a side elevation of the assembled toggles partly in section.

Referring to the drawings, the piston rods 1 and 2 are connected to the pistons 3 and 4 by any suitable flexible connection here shown as a ball joint.

The rod 1 extends from its ball joint end, is integral with the jaw end 5, the latter being in form having the prong ends 6 and 7 partially encircling the crank pin 8.

The opening into the jaw end 5 is just wide enough to receive the crank pin 8.

The rod 2 which is preferably in two parts, the ball joint end 9 and the toggle joint end 10 connected by the thread 11.

The toggle joint end 10 is of the correct width, and of U shape slightly offset to fit between the prongs 6 and 7 of the jaw end 5, and partially embraces the crank pin 8, leaving an opening 12 for the passing of the crank pin 8, which opening is closed by the closure block 13. The locking pins 14 fit into the pin grooves 15 in the walls of the joint end 10 and in the grooves 16 in the central lugs 17 from the closure block 13. The lugs 17 terminate at the ends adjacent to the inner walls of the prongs 6 and 7 while the block 13 continues under said prongs, therefore, when the parts are assembled and set at the correct angle the block 13 will be quite out of alinement with the opening into the jaw 5, thereby locking the pins between the walls of the prongs 6 and 7 and holding the ends of block under said prongs. The insertion of the block furnishes a complete and true bearing for the crank pin 8 and closes the opening 12 while the joint end 10 closes the opening to the jaw end 5.

What I claim is:

1. A piston toggle mechanism, comprising two piston rods set at an angle and a crank, one piston rod having a jaw end partially encircling the crank pin and the other piston rod having a complete bearing around the crank pin formed of a joint end partially encircling the crank pin between the jaw walls and closing the opening thereinto and a closure block extending between and under the jaw walls and having locking pins for avoiding displacement of the block.

2. A piston toggle mechanism, comprising two piston rods set at angle and a crank, one piston rod having a jaw end partially encircling the crank pin and the other piston rod having a complete bearing around the crank pin formed of a joint end partially encircling the crank pin between the jaw walls and closing the opening thereinto and a closure block extending between and under the jaw walls and having central lugs with pin grooves corresponding to pin grooves in the wall of the joint end closed by said block and pins in said grooves.

3. A piston toggle mechanism comprising piston rods set at an angle and a crank, one piston rod having a U-shaped offset end and a closure block filling in the U end for a crank pin bearing and the other piston rod having a jaw end in forked form receiving said U-shaped end and bearing on said closure block and locking devices between the U-shaped wall and the closure block.

4. A piston toggle mechanism, comprising a piston rod in one piece with a toggle joint end having spaced jaw walls, a piston rod in two pieces screw-threaded together and having one end formed to fit between said jaw walls, a crank having its pin partially encircled by said toggle joint ends of the piston rods, a closure block closing the inner toggle joint end, and means for locking said closure block within the outer toggle joint end after setting the rods.

Signed at Montreal, Quebec, Canada, this 1st day of October, 1920.

ERNEST DUCHESNE.